(12) United States Patent
Liu et al.

(10) Patent No.: US 12,406,025 B2
(45) Date of Patent: Sep. 2, 2025

(54) AUTOMATED NON-SYNCHRONIZATION AND RESOLUTION TO SUPPORT DECISION MAKING IN COMPLEX SYSTEMS

(71) Applicant: NEC Laboratories America, Inc., Princeton, NJ (US)

(72) Inventors: Yanchi Liu, Princeton, NJ (US); Haifeng Chen, West Windsor, NJ (US); Motoyuki Sato, Cupertino, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/650,930

(22) Filed: Apr. 30, 2024

(65) Prior Publication Data
US 2024/0378263 A1    Nov. 14, 2024

Related U.S. Application Data

(60) Provisional application No. 63/500,670, filed on May 8, 2023.

(51) Int. Cl.
*G06F 18/2321* (2023.01)
*G06F 18/2113* (2023.01)

(52) U.S. Cl.
CPC ...... *G06F 18/2321* (2023.01); *G06F 18/2113* (2023.01)

(58) Field of Classification Search
CPC ............. G06F 18/2321; G06F 18/2113; G06F 11/079; G06F 11/2082; G06F 16/178; H04M 2203/554; H04L 7/0016
See application file for complete search history.

(56) References Cited

U.S. PATENT DOCUMENTS

| | | | |
|---|---|---|---|
| 2021/0264294 A1* | 8/2021 | Zheng | G06F 11/16 |
| 2022/0224501 A1* | 7/2022 | Lesi | H04J 3/06 |
| 2023/0062588 A1* | 3/2023 | Patti | H04L 41/122 |
| 2023/0275915 A1* | 8/2023 | Kaul | H04L 63/1425 726/23 |
| 2024/0119386 A1* | 4/2024 | Kearns | G06Q 50/06 |

* cited by examiner

*Primary Examiner* — Huawen A Peng
(74) *Attorney, Agent, or Firm* — Joseph Kolodka

(57) ABSTRACT

Systems and methods are provided for detecting and resolving non-synchronization in a complex system, including acquiring monitoring data from multiple computers and devices within the complex system, preparing the acquired data by aligning data sequences from different sources based on timestamps, segmenting the prepared data into time windows, and extracting a plurality of features from the data within each of the time windows. Significant features are selected from the extracted features based on their relevance to non-synchronization detection and detection algorithms are applied to the selected features to identify non-synchronization events within the system. Alerts are generated, responsive to the detection of non-synchronization events, which trigger targeted, automatic corrective measures including adjusting particular system parameters to resolve the non-synchronization events and prevent occurrence of future non-synchronization events for enhanced stability and performance of the complex system.

20 Claims, 7 Drawing Sheets

AUTOMATED NON-SYNCHRONIZATION AND RESOLUTION TO SUPPORT DECISION MAKING IN COMPLEX SYSTEMS

RELATED APPLICATION INFORMATION

This application claims priority to U.S. Provisional App. No. 63/500,670, filed on May 8, 2023, incorporated herein by reference in its entirety.

BACKGROUND

Technical Field

The present invention relates to the field of synchronization management in complex computational systems, and more particularly to an automated method and system for detecting and addressing non-synchronization events in systems with multiple interconnected components.

Description of the Related Art

In the realm of complex system management, conventional approaches are limited to reactive measures, addressing synchronization discrepancies after they have already impacted system operations. These conventional methods are heavily reliant on manual monitoring and sequential data analysis, which is labor-intensive and slow to respond to the dynamic nature of systems such as power grids, telecommunication networks, industrial automation systems, satellite systems, and aerospace systems. Existing frameworks lack the predictive capabilities necessary for preemptive action, resulting in a gap between the occurrence of non-synchronization and its resolution. Moreover, the increasing complexity of systems, with vast amounts of data generated from a multitude of sensors and devices, challenges the scalability and effectiveness of traditional synchronization management solutions.

These conventional systems struggle to adapt to dynamic operational changes or unexpected anomalies that could lead to non-synchronization, potentially compromising system integrity and functionality. Furthermore, conventional systems and methods lack the capability to analyze historical data effectively to predict and preempt future non-synchronization events. The labor-intensive nature of these methods and their limited responsiveness underline the necessity for automated solutions that can promptly detect, analyze, and address non-synchronization issues within complex systems with minimal human intervention, necessitating advancements in automated, real-time detection and rectification methodologies that can not only cope with, but also anticipate and adapt to, the evolving demands of modern complex system management.

SUMMARY

According to an aspect of the present invention, a method is provided for detecting and resolving non-synchronization in a complex system, including acquiring monitoring data from multiple computers and devices within the complex system, preparing the acquired data by aligning data sequences from different sources based on timestamps, segmenting the prepared data into time windows, and extracting a plurality of features from the data within each of the time windows. Significant features are selected from the extracted features based on their relevance to non-synchronization detection and detection algorithms are applied to the selected features to identify non-synchronization events within the system. Alerts are generated, responsive to the detection of non-synchronization events, which trigger targeted, automatic corrective measures including adjusting particular system parameters to resolve the non-synchronization events and prevent occurrence of future non-synchronization events for enhanced stability and performance of the complex system.

According to another aspect of the present invention, a system is provided for detecting and resolving non-synchronization in a complex system. A memory storing instructions that when executed by a processor device cause the system to acquire monitoring data from multiple computers and devices within the complex system, prepare the acquired data by aligning data sequences from different sources based on timestamps, segment the prepared data into time windows, and extract a plurality of features from the data within each of the time windows. Significant features are selected from the extracted features based on their relevance to non-synchronization detection and detection algorithms are applied to the selected features to identify non-synchronization events within the system. Alerts are generated, responsive to the detection of non-synchronization events, which trigger targeted, automatic corrective measures including adjusting particular system parameters to resolve the non-synchronization events and prevent occurrence of future non-synchronization events for enhanced stability and performance of the complex system.

According to another aspect of the present invention, a computer program product is provided for detecting and resolving non-synchronization in a complex system, including acquiring monitoring data from multiple computers and devices within the complex system, preparing the acquired data by aligning data sequences from different sources based on timestamps, segmenting the prepared data into time windows, and extracting a plurality of features from the data within each of the time windows. Significant features are selected from the extracted features based on their relevance to non-synchronization detection and detection algorithms are applied to the selected features to identify non-synchronization events within the system. Alerts are generated, responsive to the detection of non-synchronization events, which trigger targeted, automatic corrective measures including adjusting particular system parameters to resolve the non-synchronization events and prevent occurrence of future non-synchronization events for enhanced stability and performance of the complex system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

Figure 1:
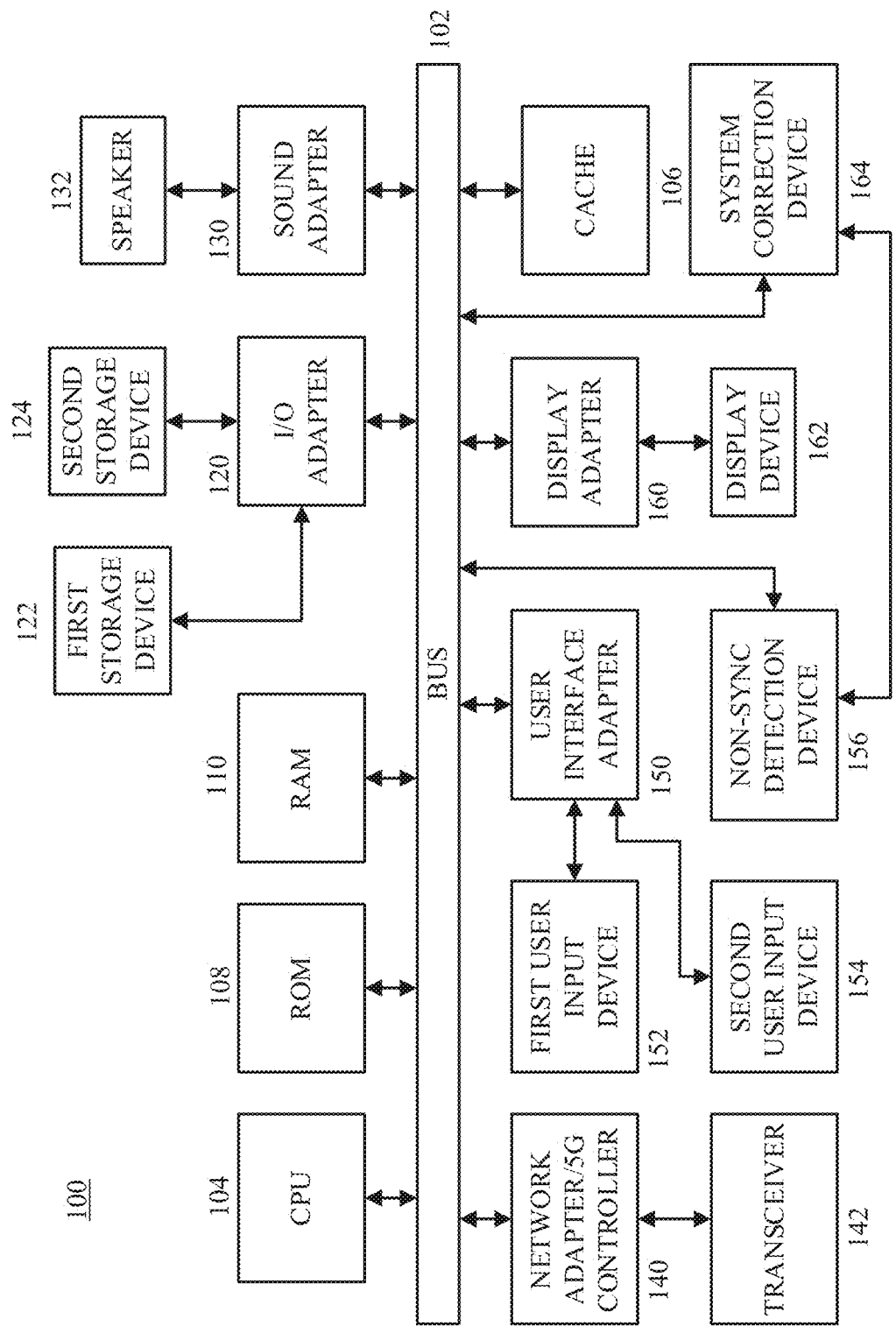
FIG. 1 is a block diagram illustratively depicting an exemplary processing system to which the present invention may be applied, in accordance with embodiments of the present invention.

In accordance with embodiments of the present invention, systems and methods are provided for proactive management of synchronization in complex systems, including autonomous operations such as those utilized in power grids, telecommunication networks, industrial automation systems, satellite control, and aerospace systems. A purpose of the invention is to establish an automated framework capable of continuous monitoring, real-time data analysis, and automated real-time corrective action in response to non-synchronization events, which can be utilized for maintaining system integrity and operational continuity. The present invention can include a sophisticated data acquisition system designed to aggregate high-volume data streams from multiple computational nodes, coupled with advanced processing units for aligning, normalizing, and segmenting the collected data. The system excels in extracting meaningful features from segmented data, utilizing machine learning algorithms to select significant features that most accurately indicate non-synchronization. With these capabilities, the system can apply detection algorithms that meticulously analyze the feature sets to identify anomalies that may disrupt system synchronization.

Furthermore, the system is not limited to mere detection; it also generates alerts and initiates automated, context-aware corrective measures to recalibrate system parameters, ensuring rapid return to optimal operating conditions. The architecture of the system underscores its ability to learn and adapt over time, analyzing historical data to refine its detection accuracy and predictive capabilities. Anchored by this intelligent detection and response mechanism, the invention provides a novel system and method for how synchronization is maintained in complex systems, offering a high degree of automation and accuracy that significantly surpasses traditional methods. By reducing the reliance on extensive human intervention and enhancing the ability to preemptively address and/or automatically correct synchronization issues, the invention provides a robust solution to the increasingly sophisticated demands of complex system management. This technology is particularly useful for applications where real-time system performance is important, such as in aerospace, telecommunications, and industrial automation, among others. It offers a dynamic, scalable approach to synchronization that can accommodate the intricate and evolving nature of modern complex systems, setting a new standard for autonomous system management.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention are described below with reference to flowchart illustrations and/or block diagrams of methods, systems, and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods, and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. A Vision Language (VL) model can be utilized in conjunction with a predictor device 164 for input text processing tasks, and can be further coupled to system bus 102 by any appropriate connection system or method (e.g., Wi-Fi, wired, network adapter, etc.), in accordance with aspects of the present invention.

A first user input device 152 and a second user input device 154 are operatively coupled to system bus 102 by user interface adapter 150. The user input devices 152, 154 can be one or more of any of a keyboard, a mouse, a keypad, an image capture device, a motion sensing device, a microphone, a device incorporating the functionality of at least two of the preceding devices, and so forth. A non-synchronization detection device 156 for detection of non-synchronization in complex systems can be included in a system with one or more storage devices, communication/networking devices (e.g., WiFi, 4G, 5G, Wired connectivity), hardware processors, etc., in accordance with aspects of the present invention. In various embodiments, other types of input devices can also be used, while maintaining the spirit of the present principles. The user input devices 152, 154 can be the same type of user input device or different types of user input devices. The user input devices 152, 154 are used to input and output information to and from system 100, in accordance with aspects of the present invention. The non-synchronization detection device 156 can process received input to detect anomalies and non-synchronization in complex systems, and a system correction device 164 can be operatively connected to the system 100 for performing automated corrective actions to the complex systems responsive to detection of anomalies or non-synchronization in the complex systems by the non-synchronization detection device, in accordance with aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 600 and 700, described below with respect to FIGS. 6 and 7, respectively, are systems for implementing respective embodiments of the present invention. Part or all of processing system 100 may be implemented in one or more of the elements of systems 600 and 700, in accordance with aspects of the present invention.

Further, it is to be appreciated that processing system 100 may perform at least part of the methods described herein including, for example, at least part of methods 200, 300, 400, 500, and 700, described below with respect to FIGS. 2, 3, 4, 5, and 7, respectively. Similarly, part or all of systems 600 and 700 may be used to perform at least part of methods 200, 300, 400, 500, and 700 of FIGS. 2, 3, 4, 5, and 7, respectively, in accordance with aspects of the present invention.

As employed herein, the term "hardware processor subsystem," "processor," or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs). These and other variations of a hardware processor subsystem are also contemplated in accordance with embodiments of the present invention.

Figure 2:
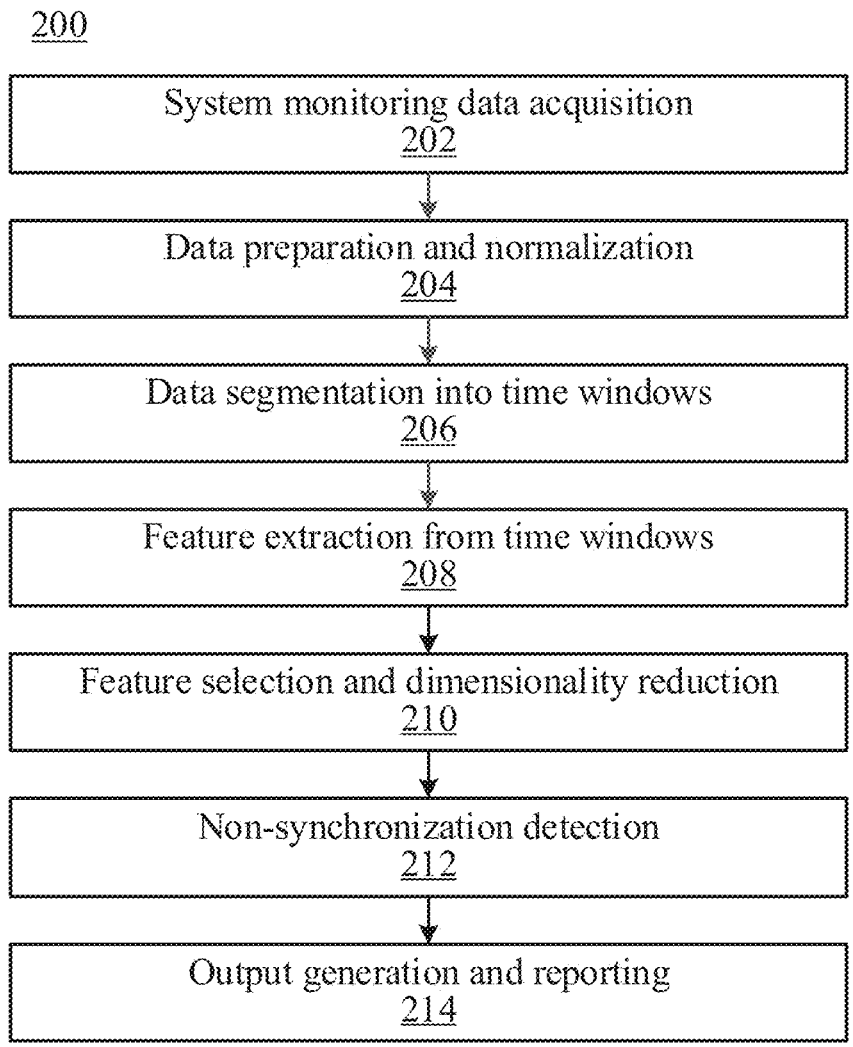
FIG. 2 is a diagram illustratively depicting a high-level view of an exemplary method for automated, real-time proactive detection and correction of non-synchronization in complex systems, in accordance with embodiments of the present invention.

Referring now to FIG. 2, a high-level view of a method 200 for automated, real-time proactive detection and correction of non-synchronization in complex systems, is illustratively depicted in accordance with embodiments of the present invention.

In various embodiments, in block 202, monitoring data can be continuously acquired from multiple computers and devices that are part of a complex system, such as a spacecraft control system. Data acquisition can include capturing real-time logs and status monitoring data that reflect the operational status of primary and backup computers within the system. The data can include, but is not limited to, system performance metrics, operational state logs, error messages, and any anomalies detected by onboard diagnostics. The process can be configured to handle high-throughput data streams from multiple sources simultaneously and ensure data integrity, even in the face of potential system malfunctions or external disruptions. This setup can also be capable of filtering and preliminary sorting of data to facilitate easier analysis in subsequent steps.

In block 204, the acquired data from block 202 can be pre-processed to prepare it for analysis. This preparation can involve aligning data sequences from different sources based on timestamps to create a synchronized timeline. Data normalization can include standardizing formats and scaling inputs to match predefined criteria, which facilitates integration. Missing data handling strategies, such as interpolation or extrapolation, can be applied to ensure the completeness and consistency of the dataset. This block can also involve the removal of outliers and noise reduction to enhance the quality of data for more accurate feature extraction.

In block 206, the normalized data from Block 204 can be segmented into discrete time windows using a sliding window technique. The size of each window, $\Delta t$, can be selected based on the expected dynamics of the system and the granularity of analysis required, noting that a size of each window can be predetermined based on a granularity of analysis required, a frequency of data recording, and/or system response characteristics in various embodiments. Segmenting the data into manageable time windows can simplify the complexity of the data and focus the analysis on changes that occur over short intervals, which can be utilized for improved detecting of synchronization discrepancies. In block 208, a variety of statistical and mathematical features can be extracted from each time window segmented in block 206. Features can include time-domain statistics such as mean, variance, and skewness, and frequency-domain features like spectral density and dominant frequency components. Advanced features can also be derived using methods such as wavelet transforms and principal component analysis (PCA) to capture underlying patterns and trends that are not immediately apparent. The feature extraction process is designed to be adaptive, allowing for the addition of new features as system dynamics evolve.

In block 210, the features extracted in block 208 can be assessed for their significance and relevance in detecting non-synchronization events. Unsupervised learning techniques, such as cluster analysis, PCA, and automatic feature selection algorithms, can be employed to identify and retain the most informative features while discarding redundant or irrelevant ones. This step can significantly reduce the dimensionality of the data, focusing the detection algorithms on the indicators of non-synchronization. In block 212, advanced detection algorithms can be applied to the selected features from block 210 to identify instances of non-synchronization. This block can utilize a combination of machine learning models, such as neural networks, decision trees, and ensemble methods like random forests or boosted trees, to analyze patterns and anomalies that suggest synchronization issues. Both point anomaly detection and sequential pattern analysis techniques can be implemented to evaluate the system's behavior over time and across different operational states.

In block 214, the results from the detection processes in block 212 can be compiled into comprehensive reports. Outputs can include detailed logs of detected non-synchronization events, their timing, severity, and probable causes based on the analysis of feature importance. This step can also provide actionable insights and recommendations for system adjustments or further investigation. Visual tools and dashboards can be included to present the data in an easily interpretable format, suitable for both technical and non-technical stakeholders, in accordance with aspects of the present invention.

Figure 3:
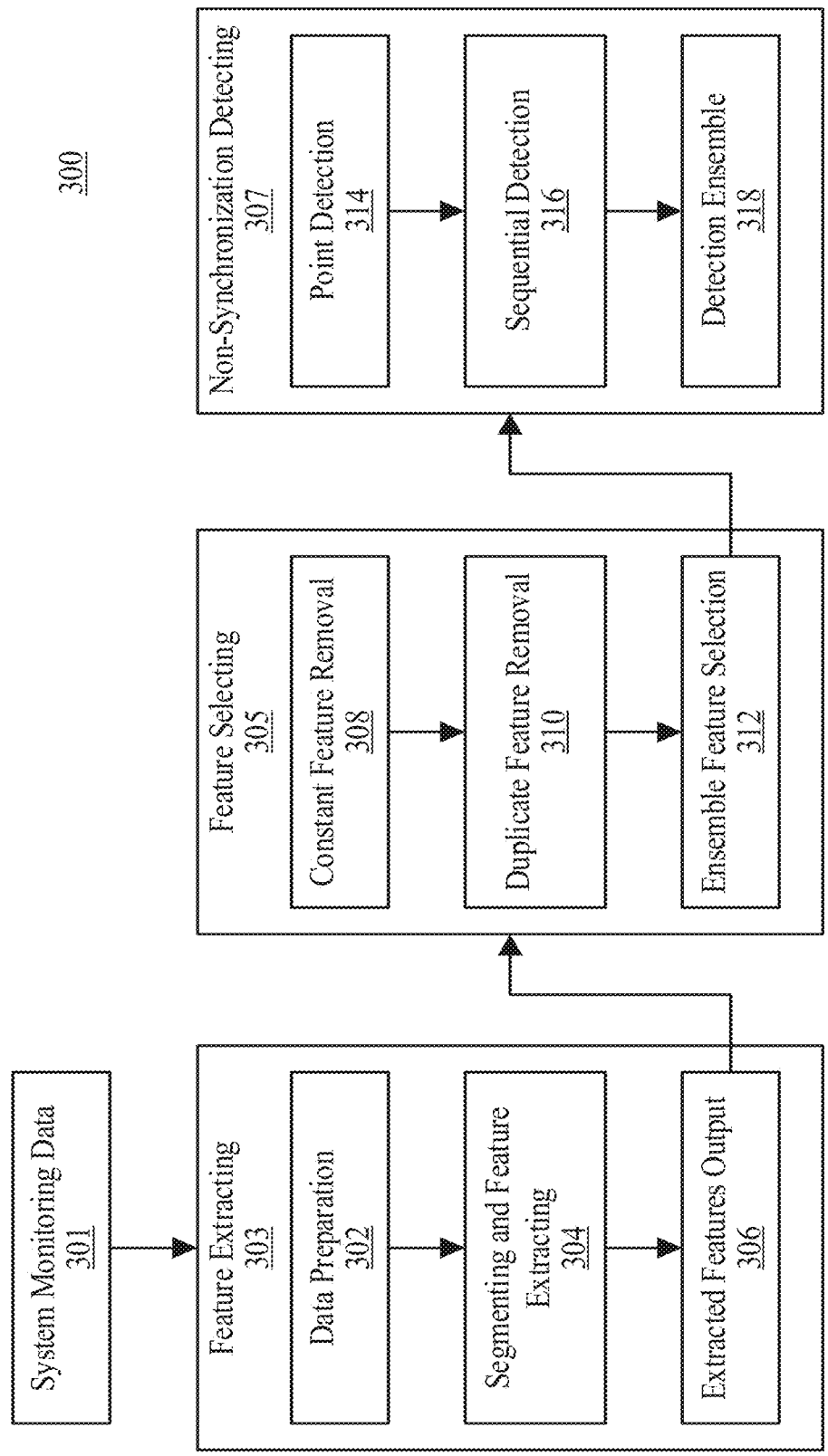
FIG. 3 is a diagram illustratively depicting a method for automated, real-time proactive detection and correction of non-synchronization in complex systems including aligning and standardizing data from multiple sources, in accordance with embodiments of the present invention.

Referring now to FIG. 3, a diagram showing a method 300 for automated, real-time proactive detection and correction of non-synchronization in complex systems including aligning and standardizing data from multiple sources, is illustratively depicted in accordance with embodiments of the present invention.

In various embodiments, in block 301, system monitoring data (e.g., status monitoring data, log data, etc.) can be captured while the system is running for further processing. In block 303, feature extracting can include converting sequences gathered from each monitoring variable $x=[x_1, \ldots, x_n]$ into a set of feature series $x^F(t) = [x_1^1(t), \ldots, x_1^m(t), \ldots, x_n^1(t), \ldots, x_n^m(t)]$ in order to handle these varied behaviors. Sliding windows can be utilized to separate the sequences and construct a library of features that potentially interpret a variety of time series evolution patterns. While it is not guaranteed that they are complete, they describe the majority of time series dynamics in complex systems. In block 305, feature selecting can include utilizing a series of unsupervised methods to determine and select the most important feature series and remove the unimportant ones, as there may be no labels for detection in a particular dataset in practice. After feature selection, the original monitoring data can be transformed to an expanded set of time series $x(t)=[x_1^1(t), \ldots, x_1^{m_1}(t), \ldots, x_n^1(t), \ldots, x_n^{m_n}(t)]$, where the transformed feature series $x(t) \in R^N (t=1, 2, \ldots, T)$, $N=\Sigma_{i=1,\ldots,n} m_i$ where $m_i$ is the number of selected features for variable i, and n is the number of variables.

In block 307, non-synchronization detecting can include utilizing an ensemble detection method to solve the non-synchronization detection problem. Both point detection methods and sequence detection methods can be applied to assign anomaly scores to the time slots, and results from both types of methods can be ensembled to generate the final ranking, in accordance with aspects of the present invention. It is notable that unlike conventional methods that evaluate the system non-synchronization with manual investigation or supervised method, the present invention provides an automated detection method with no prior knowledge needed. Further unlike conventional detection models which require using all the input features for detection, the present invention provides an ensemble feature selection method to select the most important features and remove duplicate features, which helps reduce noises in detection. Further unlike conventional detection methods which require using training data, the present invention can detect in an unsupervised manner with no training data needed. Further, multiple different types of detection methods can be applied to detect different non-synchronization patterns, and the importance of features can be provided to help user understand the reasons of anomalies, in accordance with aspects of the present invention.

In block 302, data preparation can be performed on the system monitoring data from block 301. As an illustrative example, given n monitoring variables in a system, we obtain n sequences $x=[x_1 \ldots, x_n]$, where $x_1=[x_1^{t_1}, \ldots, x_1^{t_n}]$ and $t_i=[1, \ldots, T_i]$ is the event time when variable i is recorded in the system operation period. During that period, the system might be disrupted by missing signal or system bugs that make control computers not synchronized with each other. Our goal is to detect the non-synchronization status based on sequences $x_i$ according to their contributions to the system status. That is, in the synchronized status, the sequences have dependency relation $y(t)=f(x(t-1), x(t-2), \ldots)$ whereas in the non-synchronized status the relation changes to $y(t)=g(x(t-1), x(t-2), \ldots)$, where $f(\cdot) \neq g(\cdot)$.

In block 304, segmenting and feature extracting can be performed in accordance with various embodiments of the present invention. It is noted that in the original sequences there are no time alignment of the variable records. To this end, we first segment the n original sequences $x=[x_1, \ldots, x_n]$, where $x_1=[x_1^{t_1}, \ldots, x_1^{t_n}]$ and $t_i=[1, \ldots, T_i]$ to T segments where each segment is a time interval with length $\Delta t$. Then for the subsequence in each time segment, we extract m features to represent the subsequence. In the end, we obtain n*m time series which describe the operation status of the system. Data from various variables show varying dynamics in relation to system operation. These dynamics can take on various forms, like frequencies, scales, and so forth. We convert the sequences gathered from each sensor into a set of feature series in order to handle these varied behaviors. These attributes encompass many facets of raw sequence dynamics and can be applied to identify the variables that are responsible for synchronization status variations.

Further in block 304, we construct a library of features that potentially interpret a variety of time series evolution patterns. Since we do not have any labels to supervise the feature extraction, we try to extract as many features as possible. While we cannot guarantee that they are complete, they describe the majority of time series dynamics in complex systems. In this step a sliding window strategy for feature extraction from the variable sequences can be utilized. This technique enables us to extract features from sequences while preserving continuity along the time axis. For example, let us consider the feature extraction from a specific sequence $x_i(t)$, where $i=1, \ldots, n$ is the index of recorded values and $t=1, \ldots, T$ is the time stamp. The width of the window is denoted as $\Delta t$. If the series starts from $t=t_l$, where $t_l=1, \ldots, T-\Delta t+1$, then we obtain a subsequence of width $\Delta t$, i.e., $x_i(t)$, where $t \in [t_l, t_l+\Delta t-1]$ and we can extract a possible feature value $x^{F_j}(t_l)$ from that subsequence, where $x^{F_j}(t_l)$ represents the jth feature in the pre-defined feature library F. We can extract feature $x^{F_j}(t_l)$ from $x_i(t)$ for all possible l and obtain the corresponding feature time series with length $T-\Delta t+1$, i.e., $x^{F_j}(1), x^{F_j}(2), \ldots, x^{F_j}(T-\Delta t+1)$. If we extract m feature sequences as defined in the feature library $F_1, \ldots, F_m$ for all input variable sequence $x_i(t)$ ($i=1, \ldots, n$), we will have totally m×n series.

These extracted features mainly cover the following aspects of time series properties. (1) Time series characteristics in the temporal domain include mean, standard deviation, entropy, and a few high order moments of the subsequence within each sliding window. These fundamental statistics are extracted from time series to indicate the structure of their evolution. (2) Time series characteristics in the frequency domain: We employ the power spectral density data as features and the Fast Fourier Transform (FFT) on these subsequences. In an illustration, we use the frequency's strength and position as attributes. Additionally, we can break up the frequency range into various bands and compute the power spectrum sum for each band as the feature. (3) Each time series' temporal dependencies are described using the auto-regressive (AR) model, and its coefficients are employed as features. The extracted features can be output in block 306 for further analysis and processing, in accordance with aspects of the present invention.

In block 308, constant and quasi-constant variables can be removed from the m feature time series of each variable. Constant variables show the same value in all the observations in the dataset. Quasi-constant variables show the same value in almost all the observations in the dataset. Here a threshold p is set to remove features that show the same value in more than μ percent of the observations. In block 310, directed to duplicate feature removal, we can first remove duplicated features from the feature time series. Duplicated features are identical features, regardless of the feature name. If they show the same values for every observation, then they are considered duplicated.

We also remove correlated features from the feature time series. Here a "Pearson" correlation coefficient can be calculated for each pair of the feature time series, and if the correlation is above a threshold, then one of the feature time series can be removed accordingly. In block 312, directed to ensemble feature selection, groups of correlated features can be identified, and then from each group, a feature following certain criteria (e.g., user-defined, predefined, etc.) can be selected. These can include, for example, a feature with the least missing values, a feature with the most unique values, a feature with a highest variance, a feature with a highest importance according to an estimator, etc. As a result, the final feature time series can include a selected feature from each group of correlated features, plus all original features that were not correlated to any other, in accordance with aspects of the present invention.

In block 307, after feature selection, the original monitoring data can be transformed to an expanded set of time series:

$x(t)=[x_1^1(t), \ldots, x_1^m(t), \ldots, x_n^1(t), \ldots, x_n^m(t)]^T$, where the transformed feature series $x(t) \in R^N (t=1, 2, \ldots, T)$, $N= \ldots, \Sigma_{i=1, \ldots, n} m_i$ where $m_i$ is the number of selected features for variable i, and n is the number of variables. In this step, an ensemble unsupervised anomaly detection method can be utilized to solve the non-synchronization detection problem. In block 314, point detection can be utilized to detect the non-synchronized time slots which are different from others by analyzing the features in each time slot. In this category of detection methods, the time slots can be treated independently, the non-synchronization slots can be detected for all the feature series of each monitoring variable, and anomaly scores can be obtained for each time slot $s_n^k(t)=[s_n^1(t), \ldots, s_n^k(t)]$, where $k \in 1, \ldots, K$ is the kth detection method, and K is the number of point detection models we used in detection. This results in the ensembled anomaly scores for each time slot $s_p(t)=\Sigma s_n^k(t)$. Some point detection methods which can be utilized include k nearest neighbors (kNN), isolation forest (IForest), and autoencoder (AE), noting that other point detection methods can be utilized in accordance with aspects of the present invention.

In addition to the point methods, sequential detection methods can be utilized in block 316 to detect the anomalous behavior in the feature time series. This can include utilizing previous l time slots to predict next time slot, by measuring the difference between the predicted values and the original value to identify anomalous time slots if the difference is above certain threshold. Similar to the point detection, we can apply multiple sequential detection methods to calculate the anomaly scores for each time slot, and then fuse them as the sequence anomaly score. Some sequential detection methods which can be utilized include gradient boosting regression (GBRT), recurrent neural networks with long shot term memory units (LSTM-RNN), and DeepLog, noting that other sequential detection methods can be utilized in accordance with aspects of the present invention.

In blocks 314 and 316, a point anomaly score $s_p(t)$ and sequence anomaly score $s_s(t)$, respectively, were obtained for each time slot. In block 318, the two scores can be combined to generate a final anomaly score for each time slot. We can calculate s(t) as $s(t)=w_p s_p(t)+w_s s_s(t)$, where $w_p$ and $w_s$ are the weights of anomaly scores of point detection and sequence detection, respectively. As an illustrative example, we can use 0.5 for them to have equal contribution to the final detection result. Moreover, we can determine the weights using a separate validation data if there is any, where the value of weights can be determined by the accuracy of each detection method, in accordance with aspects of the present invention.

Figure 4:
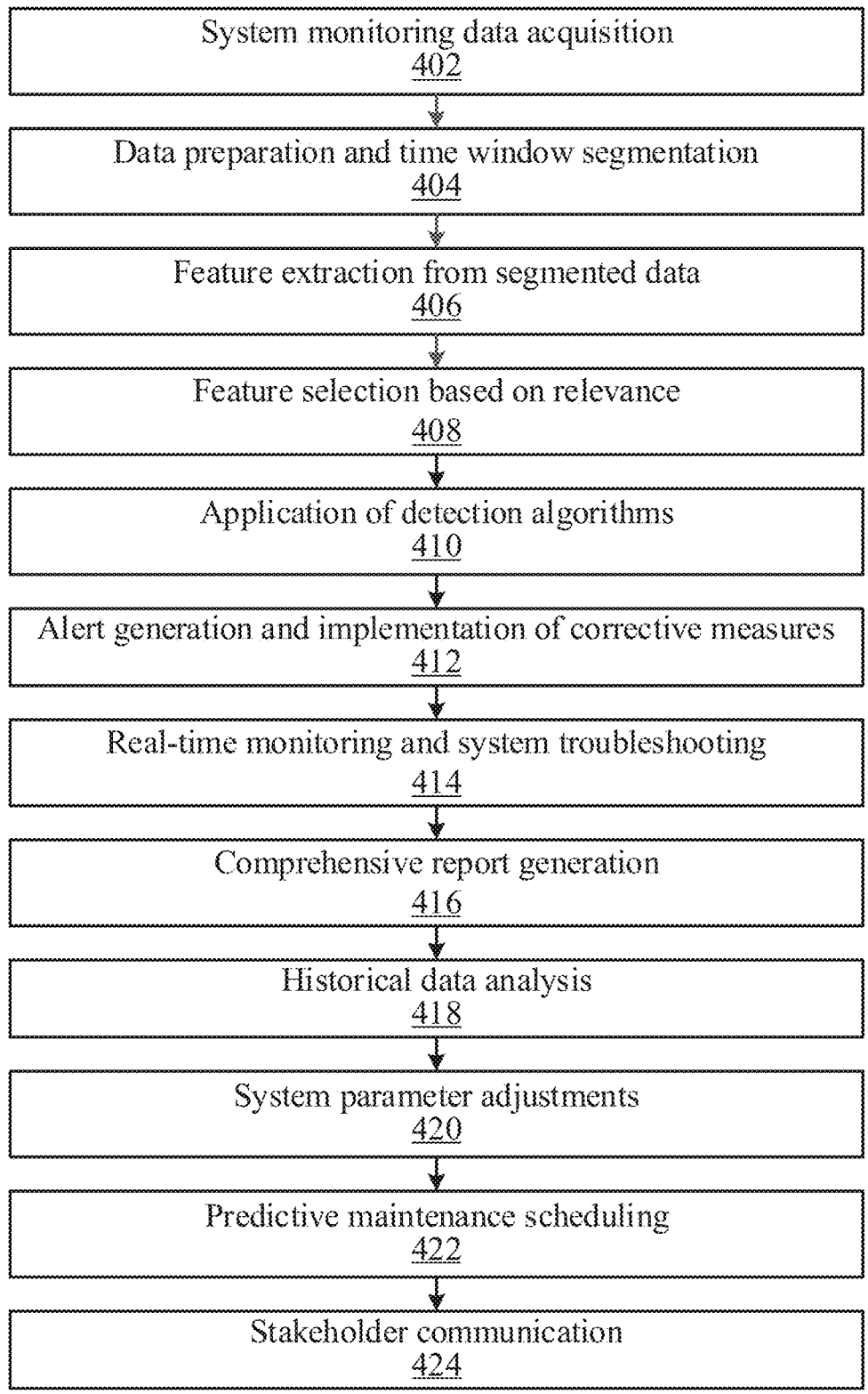
FIG. 4 is a diagram illustratively depicting a method for automated, real-time proactive detection and correction of non-synchronization and anomalies in complex systems including feature extraction and data segmentation, in accordance with embodiments of the present invention.

Referring now to FIG. 4, a diagram showing a method 400 for automated, real-time proactive detection and correction of non-synchronization and anomalies in complex systems including feature extraction and data segmentation, is illustratively depicted in accordance with embodiments of the present invention.

In various embodiments, in block 402, monitoring data can be continuously acquired from a variety of computers and devices that are integral to a complex system. This acquisition involves collecting a wide array of data types including, but not limited to, system performance metrics, operational state logs, error messages, and anomalies detected by onboard diagnostics. The system can be configured to handle high-throughput data streams and ensure data integrity by implementing robust error-checking and correction protocols, thus guaranteeing that the collected data is accurate and representative of the system's operational status.

In block 404, the acquired data can be prepared by systematically aligning data sequences from different sources based on precise timestamp information. This alignment can ensure that data from various system components are synchronized, making comparative analysis feasible. Subsequently, the aligned data can be segmented into discrete time windows using a sliding window technique. The size of each window can be meticulously determined based on the system's dynamic response characteristics and the specific analytical requirements, facilitating targeted and effective analysis in subsequent steps.

In block 406, diverse features can be extracted from the data within each time window to provide a comprehensive analysis of system behavior. This extraction process can include calculating a broad range of statistical measures such as mean, variance, skewness, and kurtosis, along with frequency-domain features like spectral density and dominant frequency components. Additional features may include time-frequency analysis outputs that capture transient behaviors and anomalies within the system, thereby enriching the dataset for more precise non-synchronization detection. In block 408, features deemed to be significant that are extracted in block 406 can be methodically selected based on their demonstrated relevance to detecting non-synchronization events. Advanced machine learning algorithms, possibly including feature ranking and selection techniques such as recursive feature elimination or automatic feature selection based on model accuracy improvements, can be employed. This step focuses on retaining the most informative features, thereby enhancing the efficiency and accuracy of the non-synchronization detection process.

In block 410, sophisticated detection algorithms can be applied to the carefully selected features to robustly identify non-synchronization events within the system. These algorithms can include a variety of machine learning and statistical techniques, such as neural networks, decision trees, or ensemble methods like random forests, which are capable of recognizing complex patterns and anomalies indicative of non-synchronization. In block 412, based on the outcomes of the detection algorithms, alerts can be generated that trigger targeted, automatic corrective measures. These measures can include fine-tuning system parameters or reconfiguring system operations to address and resolve the identified non-synchronization events, thereby preempting potential disruptions and enhancing system performance and stability.

In block 414, real-time automatic monitoring and troubleshooting measures can be implemented to continuously oversee system operations. This block can include deploying diagnostic tools and predictive maintenance algorithms that help in early detection of potential issues before they escalate, significantly reducing downtime and improving system reliability. In block 416, a comprehensive report detailing the detected non-synchronization events and their probable causes can be generated. This report can also offer a deep dive into system behavior analytics, providing actionable insights and detailed recommendations for system adjustments aimed at mitigating future non-synchronization events, thereby enhancing the reliability and operational continuity of the complex system.

In block 418, historical synchronization and performance data can be analyzed to enhance the feature selection and algorithm training processes used in earlier blocks. This analysis can help in identifying trends and patterns that are not immediately apparent, providing a historical context that can refine the detection algorithms and improve their accuracy over time. In block 420, specific system parameters can be adjusted based on the alerts generated in block 412. This step can include recalibrating or modifying operational settings to align with the recommended changes, ensuring that the system maintains optimal performance and synchronization. In block 422, predictive maintenance can be scheduled based on the insights gained from the continuous monitoring and troubleshooting activities. This scheduling can be dynamically adjusted to the system's operational demands and historical performance data, maximizing maintenance effectiveness and system uptime. In block 424, communication protocols can be established to ensure that all relevant stakeholders are informed about the system's status and any events determined to be critical in a timely manner. This communication can include automated reports, real-time dashboards, and alerts that keep system operators and maintenance personnel fully informed, facilitating quick responses to any emerging issues, in accordance with aspects of the present invention.

Figure 5:
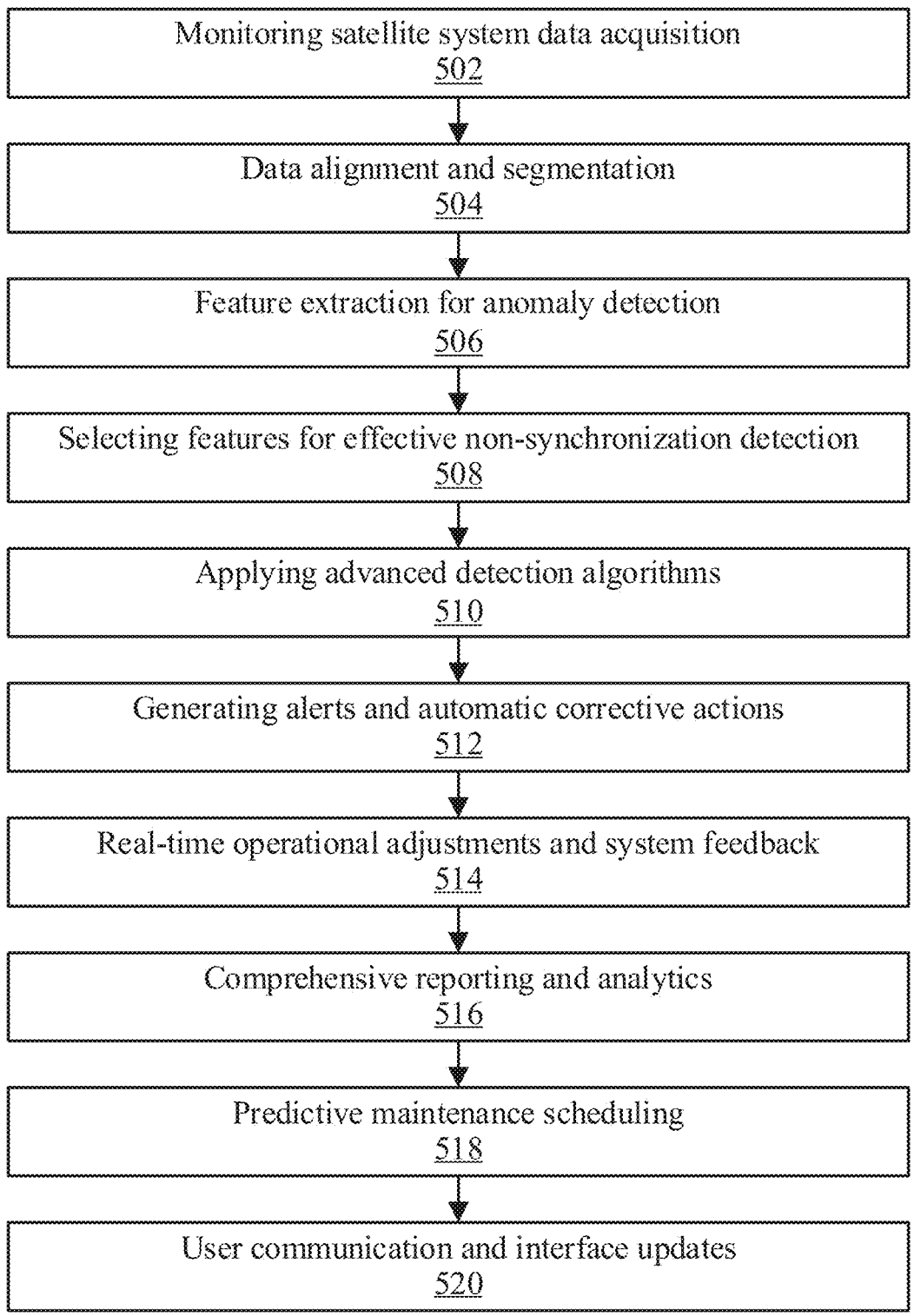
FIG. 5 is a diagram illustratively depicting a method for automated, real-time proactive detection and correction of non-synchronization and anomalies in complex satellite and aerospace systems, in accordance with embodiments of the present invention.

Referring now to FIG. 5, a diagram showing a method 500 for automated, real-time proactive detection and correction of non-synchronization and anomalies in complex satellite and aerospace systems, is illustratively depicted in accordance with embodiments of the present invention.

In various embodiments, in block 502, data can be continuously acquired from multiple computers and devices integrated within a satellite system. This includes not only performance metrics and operational logs from various subsystems but also telemetry data crucial for maintaining the satellite's operational integrity. This data acquisition system is designed to ensure robustness against the unique challenges of space environments, such as radiation and extreme temperature variations, thereby providing reliable data streams for further processing.

In block 504, acquired data can be aligned based on the precise timestamps from different subsystems of the satellite to ensure synchronization. This alignment is crucial in a space environment where even minor discrepancies can lead to significant operational anomalies. After alignment, data can be segmented into predefined time windows, considering the orbital dynamics and communication intervals typical in satellite operations, which can influence the window sizes and segmentation logic. In block 506, diverse features can be extracted from each time window to capture the dynamic behavior of the satellite system comprehensively. This includes not only basic statistical measurements but also advanced signal processing techniques that might involve spectral analysis to detect unusual frequency patterns indicative of potential system desynchronizations. These features can provide deep insights into the satellite's operational state beyond what traditional monitoring systems might detect.

In block 508, features determined to be the most relevant features for detecting non-synchronization can be selected using advanced unsupervised machine learning techniques. These techniques can include anomaly detection algorithms adapted for the high-noise environments typical in satellite data. The selection process can focus on features that are most likely to indicate synchronization issues, and can be customized for different types of complex system operations (e.g., satellite operations such as communication, earth observation, or navigational tasks), in accordance with aspects of the present invention.

In Block 510, sophisticated machine learning models, including, for example, neural networks or ensemble methods, can be applied to the selected features to identify non-synchronization events. These models can be pre-trained, trained, and/or retrained to recognize complex patterns that precede synchronization failures, using, for example, historical data and simulated anomalies. This can be utilized for proactively managing potential risks and ensuring that preventive measures can be implemented in a timely manner. In block 512, the system can generate alerts based on detected non-synchronization events and automatically initiate corrective actions. These actions can include, for example, adjusting the operational parameters of satellite subsystems or reconfiguring communication protocols to restore synchronization, among any of a plurality of other adjustments as deemed necessary by the system and/or system operators. This capability can be utilized for maintaining the continuous operation of satellite systems, particularly when human intervention is impractical due to, for example, the latency or unavailability of ground communication.

In block 514, real-time monitoring and operational adjustments can be performed based on the alerts and data from previous blocks. This can include executing automatic corrective actions, and also an adaptive learning processes where the system fine-tunes its detection algorithms based on the latest data, enhancing predictive accuracy and operational responsiveness. This adaptive capability can be effectively utilized in a plurality of scenarios, including, for example, for long-duration missions where system behavior may evolve due to aging or external environmental factors. In block 516, detailed reports and analytics can be generated, providing insights into the satellite system's synchronization status and the effectiveness of the corrective measures implemented. These reports can include trend analysis, performance benchmarks, and predictive assessments, helping satellite operators and mission planners to make informed decisions regarding future operations and system upgrades.

In block 518, predictive maintenance schedules can be adjusted based on the system's performance and anomaly detection history. This scheduling can use machine learning models to predict future maintenance needs, optimizing the timing of interventions to prevent disruptions in satellite operations while minimizing the cost and risk associated with extraneous maintenance activities. In block 520, updates and communications can be systematically provided to all relevant stakeholders, including, for example, satellite operators, mission control centers, and maintenance teams. This can include automated alerts, real-time status updates, and detailed incident reports, which can be utilized for coordinating responses to synchronization issues and for strategic planning in satellite operations, in accordance with aspects of the present invention.

Figure 6:
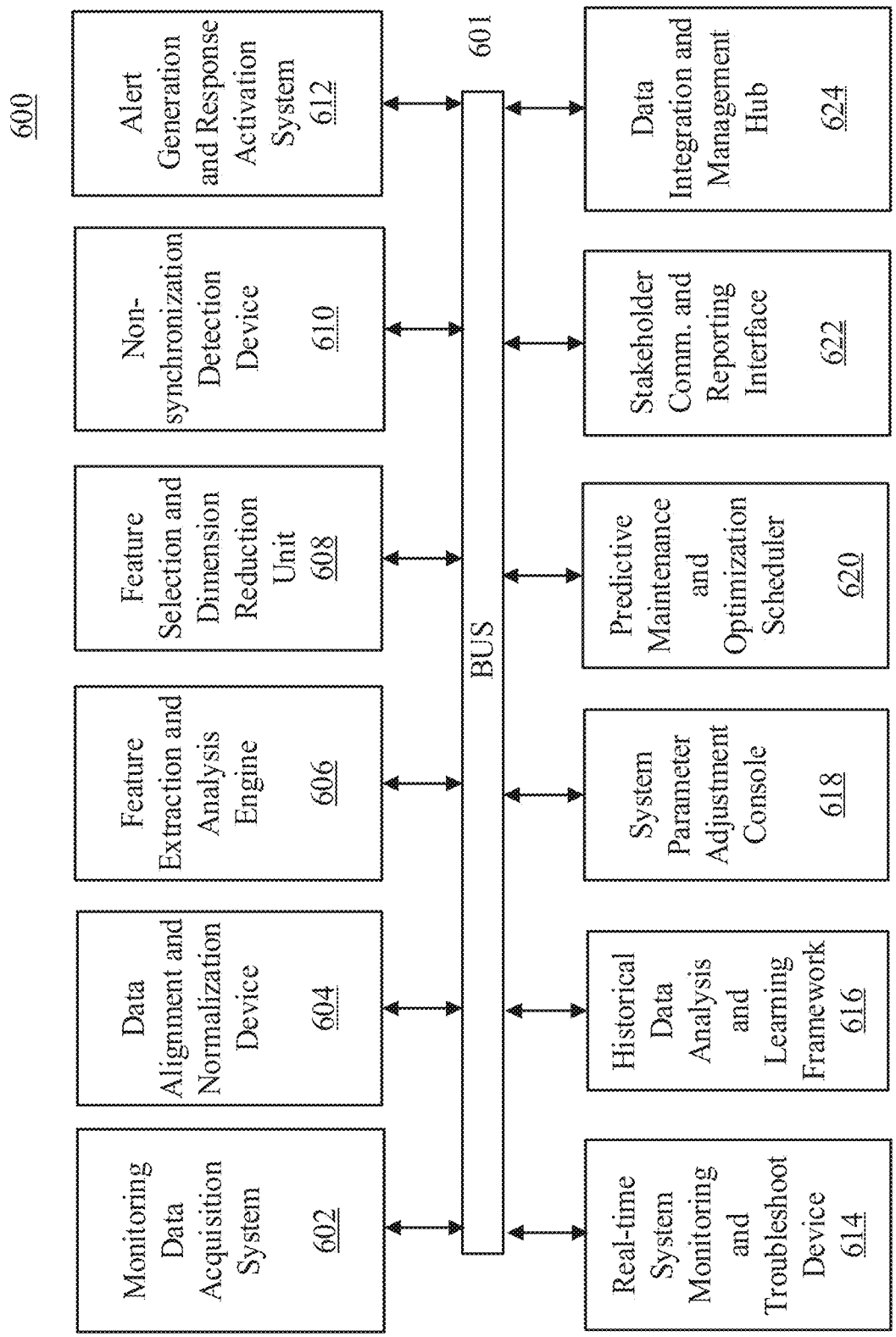
FIG. 6 is a diagram illustratively depicting a system for automated, real-time proactive detection and correction of non-synchronization in complex systems, in accordance with embodiments of the present invention.

Referring now to FIG. 6, a diagram showing a system 600 for automated, real-time proactive detection and correction of non-synchronization in complex systems, is illustratively depicted in accordance with embodiments of the present invention.

In various embodiments, the monitoring data acquisition system 602 can be intricately designed to interface with complex operational systems, such as spacecraft control systems. This system can be equipped with an array of sensors and data collection nodes, which can capture not only nominal operational data but also nuanced performance metrics, detailed error logs, and subtle anomalies that might be indicative of desynchronization events. The data acquisition system can be adept at discerning and collecting high-priority data sequences, even when facing limitations like bandwidth constraints for downlinking data from space operations. Its architecture can ensure the consolidation of disparate data sources into a unified stream for downstream processing.

The data alignment and normalization device 604 can serve to methodically process and synchronize data sequences using advanced temporal analysis algorithms. This module can leverage high-precision clocks and time-stamping protocols to align data with temporal accuracy, mitigating issues arising from asynchronous data collection points. It can normalize data across multiple formats and standards, smoothing out discrepancies that may arise from varying sensor calibrations or data logging intervals. This module's operations can particularly useful in systems where synchronization precision directly impacts operational effectiveness and system reliability.

The feature extraction and analysis engine 606 can utilize a comprehensive suite of statistical methods and algorithms to dissect and interpret the time-segmented data. It can extrapolate a rich set of features, potentially drawing from a broad spectrum of time-domain and frequency-domain analyses. This can include calculating high-order moments of data sequences, extracting entropy measures, and applying Fourier transform techniques to reveal underlying patterns that are characteristic of synchronization or desynchronization within the system. This engine can also handle the complexity of multi-variable interactions, discerning feature interdependencies for accurate anomaly and/or non-synchronization detection.

A feature selection and dimensionality reduction unit 608 can employ a series of unsupervised machine learning algorithms to sift through the myriad features extracted by the analysis engine. It can isolate those features that are most impactful in identifying non-synchronization, applying techniques like principal component analysis, cluster analysis, and other dimensionality reduction strategies. This process can significantly enhance detection efficacy by focusing analytical efforts on the most salient features and reducing the computational overhead associated with handling extraneous data. The non-synchronization detection device 610 can be a sophisticated amalgamation of various machine learning models and statistical approaches designed to assess and score the synchronization state of the system. This algorithm can include both point-based and sequence-based detection methods, applying anomaly scoring to individual time slots and assessing time series for aberrant patterns. It can aggregate results from multiple detection methods into a unified assessment, utilizing a weighted ensemble approach to enhance accuracy and robustness.

An alert generation and response activation system 612 can act as the system's response mechanism to detected non-synchronization events. Upon detection, this system can autonomously initiate a series of predefined corrective actions, ranging from system parameter adjustments to more complex remedial protocols. This system's design can incorporate fail-safes and redundancy checks to ensure that the corrective measures it enacts are both appropriate for the detected events and do not inadvertently introduce further system instabilities. A real-time system monitoring and troubleshooting device 614 can integrate real-time monitoring capabilities, continuously surveying system operations to detect early signs of potential non-synchronization. It can employ predictive analytics to pre-emptively address issues before they escalate into critical events. Additionally, the module can incorporate troubleshooting protocols that guide system operators through systematic diagnostics and remediation processes, streamlining maintenance activities and reducing system downtime.

The historical data analysis and learning framework 616 can retrospectively analyze synchronization events and non-synchronization occurrences to enrich the system's knowledge base. This framework can refine feature extraction and detection algorithms over time, adapting to evolving system dynamics and operational changes. Its machine learning components can be self-adjusting, using historical trends and patterns to anticipate future system behaviors and fine-tune the system's predictive and detection capabilities. A system parameter adjustment console 618 can provide interactive interfaces and automated routines for adjusting and calibrating system operations in light of detected non-synchronization events. It can interpret alerts and enact system-wide or localized parameter adjustments to re-establish synchronization and system equilibrium. This console can allow for both manual and automated control, providing operators with the ability to intervene when necessary while also relying on the system's autonomous capabilities for immediate response.

The predictive maintenance and optimization scheduler 620 can orchestrate maintenance activities based on a deep understanding of the system's operational data and history of anomaly detections. It can prioritize maintenance tasks to optimize resource allocation, minimize system downtime, and preempt potential desynchronization events. This scheduler can be dynamically adaptive, modifying maintenance schedules based on real-time data feeds and predictive modeling outcomes. A stakeholder communication and reporting interface 622 can serve as the communication hub for the system, disseminating detailed reports, alerts, and updates to relevant stakeholders. It can be engineered to present information in a clear and actionable manner, ensuring that all parties are kept informed and can act swiftly in response to system needs. The interface can feature customizable dashboards, automated reporting systems, and alert notification mechanisms.

A data integration and management hub 624 can act as the central repository and processing center for the system. It can consolidate data from various subsystems, manage data flow to and from the analysis and detection components, and ensure that data integrity is maintained throughout the process. This hub can support the high-velocity data exchange needed for real-time system synchronization monitoring and can be scalable to accommodate system expansions or upgrades. Together, these blocks represent a system 600, interconnected by communication bus 601, which facilitates the flow of data and instructions for the holistic functioning of the system, in accordance with aspects of the present invention.

Figure 7:
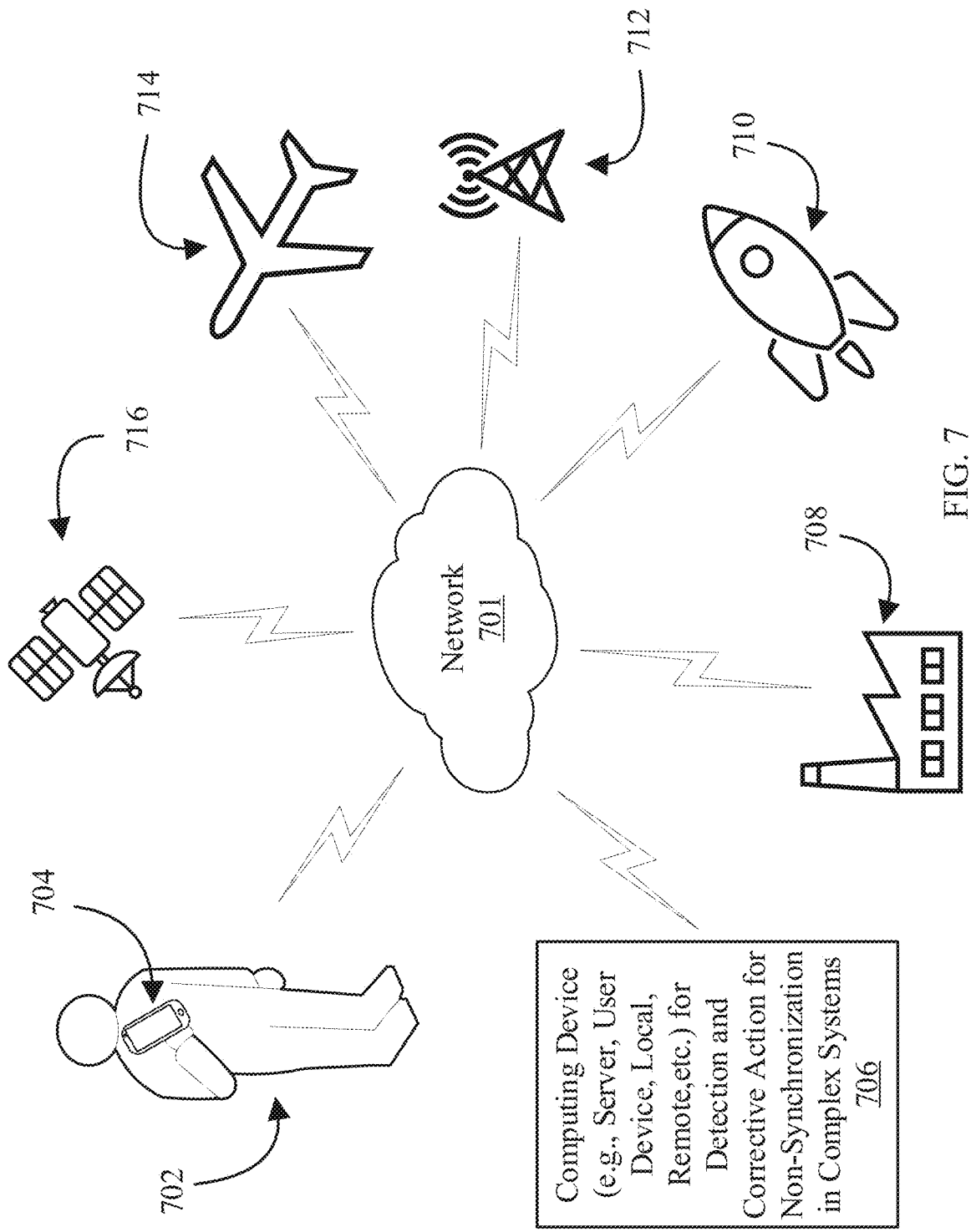
FIG. 7 is a diagram illustratively depicting a high-level view of a system and method for automated, real-time proactive detection and correction of non-synchronization and anomalies in a variety of complex systems, in accordance with embodiments of the present invention.

Referring now to FIG. 7, a diagram showing a high-level view of a system and method 700 for automated, real-time proactive detection and correction of non-synchronization in a variety of complex systems, is illustratively depicted in accordance with embodiments of the present invention. The system 700 is designed to maintain and manage synchronization across diverse complex systems. It represents an integrated network that centralizes the synchronization process, featuring an advanced computing infrastructure and user interface that together facilitate the proactive monitoring and automated rectification of non-synchronization events in real-time. This system can be cloud-based, enabling extensive scalability and robustness by leveraging distributed computing resources to process and analyze vast amounts of data generated by various operational systems.

A user 702 is depicted as interacting with the system through a user interaction and control device 704. This user can be a system operator, maintenance technician, or a controller responsible for monitoring the synchronization status of various systems, issuing commands when necessary, and overseeing the automated corrective actions undertaken by the system. The user's role involves initiating system checks, validating alerts, and making informed decisions based on the comprehensive data and analysis provided by the system. The user interaction and control device 704 (e.g., tablet, smartphone, laptop, dedicated control terminal, etc.) can serve as a primary interface for user interaction with the overall system. The user device can be equipped with specialized software that allows for the real-time visualization of system status, alert notifications, and detailed reports on synchronization metrics. Through this device, the user can input commands, configure system parameters, and access historical data analytics to guide system operations and maintenance schedules.

The centralized computing device 706 (e.g., a server, array of servers, personal computer, etc.) represents the computational backbone of the system. It is programmed to execute backend processes, which can include the detection of non-synchronization events and the issuance of commands for corrective actions. The device can host sophisticated machine learning algorithms that analyze data to predict and prevent potential synchronization issues across the various connected systems. The server can be located remotely or on-premises, providing the necessary computational power to support complex data analysis and decision-making processes in real-time.

Block 708 symbolizes an industrial automation system within a factory setting, which is one of the many complex systems managed by the overall system 700. The factory can incorporate a wide array of automated machinery, robotics, and control systems that require precise synchronization to function optimally. The integration with the synchronization management system ensures that any deviations in operational timing or coordination among machinery are quickly identified and corrected, maintaining high efficiency and minimizing downtime.

Block 710 represents a spacecraft, which can include both manned and unmanned vehicles that operate in space. The spacecraft's subsystems (e.g., navigational controls, communication arrays, life support, etc.) rely heavily on precise synchronization for mission success. The system's ability to detect and rectify synchronization anomalies can be effectively utilized in any type of environment, including, for example, environments where manual intervention is limited or delayed, ensuring the spacecraft's continued operational integrity. The telecommunications system 712 depicted in the figure includes terrestrial communication infrastructure like cell towers and satellites, which are integral to modern communications. Maintaining synchronization across these components is vital to ensuring seamless data transmission and connectivity. The system's real-time monitoring and corrective action capabilities can be effectively utilized for preventing communication failures and data loss.

Block 714 represents an aircraft, encompassing both commercial and military aviation systems. The synchronization management system can play a pivotal role in ensuring the aircraft's navigational systems, control surfaces, and onboard computers remain synchronized, which can be utilized to ensure safe and efficient operation. A satellite 716, an example of a complex system where synchronization can be highly valued for operations such as data collection, communication relay, and positioning. The satellite's integration into the synchronization management system ensures that orbital operations are closely monitored, and any drift or desynchronization can be addressed proactively, safeguarding critical space-based services. The system 700 is highly versatile, applicable across multiple domains, in particular those which require stringent synchronization for safety, reliability, and performance. The system's design allows for both the detection of non-synchronization events and the automatic initiation of corrective measures, showcasing the integration of various complex systems within a unified management framework, in accordance with aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment," as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for detecting and resolving non-synchronization in a complex system, comprising:
    acquiring monitoring data from multiple computers and devices within the complex system;
    preparing the acquired data by aligning data sequences from different sources based on timestamps, and segmenting the prepared data into time windows;
    extracting a plurality of features from the data within each of the time windows;
    selecting significant features from the extracted features based on their relevance to non-synchronization detection, the relevance being determined by feature ranking and recursive feature elimination;
    applying detection algorithms to the selected features to identify non-synchronization events within the system, the detection algorithms including unsupervised neural networks; and
    generating alerts, responsive to the detection of non-synchronization events, which trigger targeted, automatic corrective measures including adjusting particular system parameters to resolve the non-synchronization events and prevent occurrence of future non-synchronization events for enhanced stability and performance of the complex system.

2. The method of claim 1, wherein the acquiring the monitoring data includes real-time capturing of system performance metrics, operational state logs, error messages, and anomalies detected by onboard diagnostics.

3. The method of claim 1, wherein the segmenting the prepared data includes utilizing a sliding window technique, with a size of each window being predetermined based on a granularity of analysis required, a frequency of data recording, and system response characteristics.

4. The method of claim 1, wherein the extracting the plurality of features includes calculating statistical measures including mean, variance, skewness, and kurtosis, and frequency-domain features including spectral density and dominant frequency components.

5. The method of claim 1, further comprising utilizing machine learning algorithms during the selecting of the significant features to determine a significance of each feature based on historical synchronization data, and enhance an accuracy of non-synchronization detection based on an analysis of extracted features.

6. The method of claim 1, further comprising real-time automatic monitoring, troubleshooting, and iterative implementing of the automatic corrective measures for the complex system to improve operational efficiency and uptime of the complex system.

7. The method of claim 1, further comprising generating a report identifying the detected non-synchronization events and probable causes, the report including recommendations for system adjustments to mitigate the future non-synchronization events to further enhance reliability and operational continuity of the complex system.

8. A system for detecting and resolving non-synchronization in a complex system, comprising:
   a processor device; and
   a memory storing instructions that, when executed by the processor device, cause the system to:
      acquire monitoring data from multiple computers and devices within the complex system;
      prepare the acquired data by aligning data sequences from different sources based on timestamps, and segment the prepared data into time windows;
      extract a plurality of features from the data within each of the time windows;
      select significant features from the extracted features based on their relevance to non-synchronization detection, the relevance being determined by feature ranking and recursive feature elimination;
      apply detection algorithms to the selected features to identify non-synchronization events within the system, the detection algorithms including unsupervised neural networks; and
      generate alerts, responsive to the detection of non-synchronization events, which trigger targeted, automatic corrective measures including adjusting particular system parameters to resolve the non-synchronization events and prevent occurrence of future non-synchronization events for enhanced stability and performance of the complex system.

9. The system of claim 8, wherein the acquiring the monitoring data includes real-time capturing of system performance metrics, operational state logs, error messages, and anomalies detected by onboard diagnostics.

10. The system of claim 8, wherein the segmenting the prepared data includes utilizing a sliding window technique, with a size of each window being predetermined based on a granularity of analysis required, a frequency of data recording, and system response characteristics.

11. The system of claim 8, wherein the extracting the plurality of features includes calculating statistical measures including mean, variance, skewness, and kurtosis, and frequency-domain features including spectral density and dominant frequency components.

12. The system of claim 8, wherein the instructions further cause the system to utilize machine learning algorithms during selecting of the significant features to enhance an accuracy of non-synchronization detection based on an analysis of extracted features.

13. The system of claim 8, wherein the instructions further cause the system to execute real-time automatic monitoring, troubleshooting, and iterative implementing of the automatic corrective measures for the complex system to improve operational efficiency and overall system performance.

14. The system of claim 8, wherein the instructions further cause the system to generate a report identifying the detected non-synchronization events and probable causes, including providing recommendations for system adjustments to mitigate the future non-synchronization events to further enhance reliability and operational continuity of the complex system.

15. A computer program product for detecting and resolving non-synchronization in a complex system, the computer program product comprising a computer-readable storage medium having program instructions embodied therewith, the program instructions executable by a hardware processor to cause the hardware processor to:
   acquire monitoring data from multiple computers and devices within the complex system;
   prepare the acquired data by aligning data sequences from different sources based on timestamps, and segment the prepared data into time windows;
   extract a plurality of features from the data within each of the time windows;
   select significant features from the extracted features based on their relevance to non-synchronization detection, the relevance being determined by feature ranking and recursive feature elimination;
   apply detection algorithms to the selected features to identify non-synchronization events within the system, the detection algorithms including unsupervised neural networks; and
   generate alerts, responsive to the detection of non-synchronization events, which trigger targeted, automatic corrective measures including adjusting particular system parameters to resolve the non-synchronization events and prevent occurrence of future non-synchronization events for enhanced stability and performance of the complex system.

16. The computer program product of claim 15, wherein the acquiring the monitoring data includes real-time capturing of system performance metrics, operational state logs, error messages, and anomalies detected by onboard diagnostics.

17. The computer program product of claim 15, wherein the segmenting the prepared data includes utilizing a sliding window technique, with a size of each window being predetermined based on a granularity of analysis required, a frequency of data recording, and system response characteristics.

18. The computer program product of claim 15, wherein the extracting the plurality of features includes calculating statistical measures including mean, variance, skewness, and kurtosis, and frequency-domain features including spectral density and dominant frequency components.

19. The computer program product of claim 15, wherein the program instructions further cause the hardware processor to execute real-time automatic monitoring, troubleshooting, and iterative implementing of the automatic corrective measures for the complex system to improve operational efficiency and overall system performance.

20. The computer program product of claim 15, wherein the program instructions further cause the hardware processor to generate a report identifying the detected non-synchronization events and probable causes, including providing recommendations for system adjustments to mitigate the future non-synchronization events to further enhance reliability and operational continuity of the complex system.

* * * * *